United States Patent [19]
Kaneko et al.

[11] 4,287,316
[45] Sep. 1, 1981

[54] TRANSPARENT RESIN COMPOSITION FOR INFORMATION SIGNAL RECORDING DISCS

[75] Inventors: Akira Kaneko, Tokyo; Masaki Ohya, Iwaki; Masayasu Suzuki, Iwaki; Akio Kobayashi, Iwaki, all of Japan

[73] Assignee: Kureha Kagaku Kogyo Kabushiki Kaisha, Tokyo, Japan

[21] Appl. No.: 32,928

[22] Filed: Apr. 19, 1979

[30] Foreign Application Priority Data

Apr. 24, 1978 [JP] Japan .................................. 53-47876

[51] Int. Cl.³ .......................... C08L 9/02; C08L 33/08
[52] U.S. Cl. .................................... 525/296; 369/274; 369/284; 525/77; 525/78; 525/79; 525/85; 525/218; 525/221; 525/222; 525/224; 525/227; 525/228; 525/230; 525/234; 525/263; 525/298; 525/301; 525/302; 525/309; 525/310; 525/312; 525/315; 525/316; 525/932; 525/83
[58] Field of Search ...................... 525/77, 80, 234, 87, 525/218, 221, 222, 224, 227, 228, 230, 263, 298, 296, 301, 302, 309, 312, 310, 315, 316, 78, 79, 83, 85; 179/100.1, 100.3 G, 100.3 V; 369/274, 284

[56] References Cited

U.S. PATENT DOCUMENTS

| | | | |
|---|---|---|---|
| 3,222,422 | 12/1965 | Cohen | 525/316 |
| 3,354,238 | 11/1967 | Schmitt et al. | 525/84 |
| 4,125,654 | 11/1978 | Kaneko et al. | 525/70 |

*Primary Examiner*—J. Ziegler
*Attorney, Agent, or Firm*—Wenderoth, Lind & Ponack

[57] ABSTRACT

A transparent resin composition comprising (1) 6 to 100% by weight of a nitrile graft copolymer comprising a rubber trunk polymer and a branch polymer grafted thereon, which has been obtained by graft-polymerizing onto the rubber trunk polymer a monomer mixture containing an unsaturated nitrile and a monomer copolymerizable therewith, and (2) 0 to 94% by weight of a random copolymer of an unsaturated nitrile and a monomer copolymerizable therewith, the resin components of the resin composition other than the rubber trunk polymer constituting a matrix resin, wherein
 (a) said rubber trunk polymer has a glass transition temperature of not higher than 0° C. and constitutes 4 to 25% by weight of the resin composition,
 (b) the unsaturated nitrile constitutes 25 to 90% by weight of the matrix resin in the resin composition,
 (c) the difference in the refractive indexes between the rubber trunk polymer and the matrix resin is not more than 0.008, and
 (d) the resin composition, when molded into a 3 mm-thick plate, has a transmittance in diethyl phthalate of not lower than 95% with respect to the laser rays used.

The above described resin composition has excellent transparency and molding fidelity and can be used for molding information signal recording discs, information pits being engraved on one side of each disc, and a metal coating being deposited thereon, the information signals recorded on the information pits being reproducible by irradiation with laser rays from the other side of said disc.

8 Claims, No Drawings

TRANSPARENT RESIN COMPOSITION FOR INFORMATION SIGNAL RECORDING DISCS

BACKGROUND OF THE INVENTION

This invention relates to a resin composition for information signal recording discs (hereinafter referred to simply as "information discs" or "discs") comprising nitrile copolymers, which has excellent transparency, molding fidelity and anti-electrification.

A variety of video discs, audio discs and the like have been known wherein information signal pits are engraved on one side of the disc, and a metal coating is deposited thereon, the information signals recorded onto the pits being reproducible by irradiation thereof with laser rays from the other side of the disc.

As materials for fabrication of such discs, rigid vinyl chloride resins have been mainly considered. Some problems, however, have been pointed out with respect to the rigid vinyl chloride resins used for this purpose. The first problem is that various additives such as thermal stabilizers, antistatic agents, lubricants and releasing agents are admixed into the vinyl chloride resins, whereby these additives bleed out of the surface of the resulting disc with time, leading to deterioration of the transmittance of light rays. On the other hand, when the amounts of these additives are decreased to suppress the bleeding, continuous molding of the discs becomes difficult. The second problem relating to these rigid vinyl chloride resins is that there has been no satisfactory antistatic agent which exhibits antistatic effect without impairing thermal stability and bleed resistance. As a result, even a slight friction gives rise to attraction of dust to the discs, which becomes a cause of noise. A variety of apparatuses have been designed to solve such problems but are still far from being fully satisfactory.

The present inventors have been engaged in research for many years on novel resins which can be effectively used in place of such rigid vinyl chloride resins and have found that a specific nitrile resin has a good antistatic property and excellent thermal stability and, moreover, requires no auxiliaries such as antistatic agents, lubricants, releasing agents, and thermal stabilizers. Thus, these nitrile resins can maintain transparency and antistatic properties for a very long time in comparison with the conventional vinyl chloride resins (as set forth in Japanese patent applications Nos. 68406/76, 72022/76 and 148538/76, and U.S. Pat. No. 4,125,654).

The present inventors have carried out further research on the optimum materials for information discs from which recorded information is reproducible by irradiation with laser rays. The resin material for such information discs especially requires, in addition to the above-mentioned anti-electrification, transparency to amply transmit laser lays, and molding fidelity so that the minute concavities and convexities of a stamper for engraving information pits of high recording density can be produced on the information discs with fidelity. It is known that such molding fidelity is not only related to the melt viscosity at the molding temperature of the resin material but also is closely related to the melt elasticity of the resin material.

The above-mentioned nitrile resins which the present inventors have already developed (e.g., as disclosed in Japanese Patent Application 68406/76, U.S. Pat. No. 4,125,654, etc.) do not fully satisfy these properties, especially transparency.

SUMMARY OF THE INVENTION

It is a primary object of the present invention to provide a resin composition having excellent transparency and molding fidelity which is suitable for information discs from which information signals are reproducible by means of laser rays.

Other objects of the invention will be apparent from the following description.

As mentioned above, the melt elasticity of the resin composition is one of the important factors in the present invention. As a result of their studies, the present inventors consider die swell as one measure of the melt elasticity of the resin composition and have found that a nitrile copolymer having a rubber trunk polymer phase has less die swell and better molding fidelity of information discs than a nitrile random copolymer.

Surprisingly, it has also been found that a resin composition comprising a rubber trunk polymer dispersed in a nitrile copolymer matrix is improved in transparency in comparison with nitrile random copolymer resins. The transparency is further improved especially when the particles of the rubber trunk polymer are in a particle size range of 0.03 to 0.3$\mu$.

In accordance with the present invention, there is provided, in a transparent resin composition for information discs, each having information pits engraved on one side thereof and a metal coating deposited thereon, information signals recorded on the information pits being reproducible by irradiation with laser rays from the opposite side of each disc, the improvement wherein the resin composition comprises (1) 6 to 100% by weight of a nitrile graft copolymer having a rubber trunk polymer and a branch polymer grafted thereon, which has been obtained by graft-polymerizing onto the rubber trunk polymer a monomer mixture containing an unsaturated nitrile and a monomer copolymerizable therewith, and (2) 0 to 94% by weight of a random copolymer of an unsaturated nitrile and a monomer copolymerizable therewith, the resin components of the resin composition other than the rubber trunk polymer, including the random copolymer and the branch polymer of said graft copolymer, constituting a matrix resin, wherein:

(a) said rubber trunk polymer has a glass transition temperature of not higher than 0° C. and constitutes 4 to 25% by weight of the resin composition;

(b) the unsaturated nitrile constitutes 25 to 90% by weight of the matrix resin in the resin composition;

(c) the difference in the refractive indexes between the rubber trunk polymer and the matrix resin is not more than 0.008; and (d) the resin composition, when molded into a 3 mm-thick plate, has a transmittance in diethyl phthalate of not lower than 95% with respect to the laser rays used.

Among the facts discovered by the inventors as described above, particularly the fact that the nitrile resin containing the rubber trunk polymer is superior in transparency to the nitrile resin containing no rubber trunk polymer appears at first to be strange. Of course, as a premise of such comparison, it is necessary that both the refractive index of the rubber trunk polymer and that of the matrix resin be controlled to a degree such that they can be considered to be identical.

As mentioned above, since the resin composition of the present invention is required to transmit laser rays, the refractive indexes of the rubber trunk polymer and of the matrix resin should be especially controlled to be of a degree such that they can be considered to be identical. In this connection, the present inventors have found that, when the difference in the refractive indexes between the rubber trunk polymer and the matrix resin is not more than 0.008, a disc 3 mm in thickness fabricated from the present resin composition exhibits a transmittance in diethyl phthalate of not lower than 95% with respect to the laser rays used. Thus a resin composition for information discs having excellent transparency is obtained.

By the term "matrix resin" as used herein are meant the resin components exclusive of the rubber trunk polymer in the resin composition, that is, the resin components essentially consisting of the branch polymer of the nitrile graft copolymer plus the nitrile random copolymer. Thus, the matrix resin designates the branch polymer of the nitrile graft copolymer when the composition contains no nitrile random copolymer, and also designates the phase essentially consisting of the nitrile random copolymer and branch polymer when the composition contains the random copolymer.

When the nitrile random copolymer and branch polymer constitute the matrix resin, the refractive index of the matrix resin is represented by the following formula.

$$n_{mat} = \frac{n_g \phi_g + n_r \phi_r}{\phi_g + \phi_r},$$

wherein: $n_{mat}$, $n_g$ and $n_r$ are the refractive indexes of the matrix resin, branch polymer, and random polymer, respectively; and $\phi_g$ and $\phi_r$ are the weight fractions of the branch polymer and random polymer in the whole composition, respectively. When the matrix resin contains a resin other than these nitrile copolymers, $n_{mat}$ can be calculated from a formula similar to the above formula. In any case, it is necessary that the difference between the refractive indexes of the rubber trunk polymer and the matrix resin be not more than 0.008.

As mentioned above, in the comparison of the systems in which control was exercised for the purpose of transparency, the system containing the rubber trunk polymer phase has a higher transparency. The present inventors have carried out research also in this respect, and have reached a hypothesis that a lower molecular-weight nitrile compound formed inevitably in the presence of a considerable amount of a chain transfer agent, which is required to obtain good moldability for the fabrication of information discs, as well as a low molecular-weight substance such as polymerization auxiliaries, are absorbed in the rubber phase and permeate among the rubber molecules and, as a result, transparency is improved; whereas when such a rubber phase is absent, the matrix copolymer and the low molecular-weight substances cause phase separation and transparency deteriorates. Even though rubber molecules are dispersed into the resin composition, in the case of a mere mixture in which the rubber molecules are not bonded with the matrix polymer, a phase separation takes place between the diverse polymers, and thus, transparency deteriorates. It is to be understood, however, that this hypothesis is not intended to restrict the scope of the present invention.

DETAILED DESCRIPTION OF THE INVENTION

The resin composition for discs of the present invention is to be used for the fabrication of information discs wherein information signal pits are engraved on one side of the discs, and a metal coating is deposited thereon, the information signals recorded on the information pits being reproducible by irradiation with laser rays from the opposite side of the disc. The disc may be composed of a single piece, or it may be composed of two identical pieces whose metal-coated surfaces are bonded together with a suitable bonding agent such as resins. The term "disc" typically represents a disc-like shape, but is not restricted thereto. The discs according to the present invention can also take any of shapes such as drums, rectangular plates, and tapes, provided that the disc has the 3-layer structure comprising a resin layer, information signal pits, and a metal coating.

The resin composition of the present invention for information discs comprises 6 to 100% by weight of a nitrile graft copolymer and 0 to 94% by weight of a nitrile random copolymer. When the quantity of the nitrile graft copolymer is less than 6% by weight, the amount of the branch polymer contributing to the dispersion of the rubber trunk polymer becomes too small since at least 4% by weight of the rubber trunk polymer must be contained in the total resins as discussed below. Thus, such a small quantity is not desirable since the homogeneous dispersion of the rubber trunk polymer becomes difficult.

The resin composition of the present invention can contain 0 to 10% by weight of another compatible resin in addition to the above mentioned nitrile copolymers. It is preferred, however, that the composition not contain such a compatible resin other than the nitrile copolymers.

The rubber trunk polymer which constitutes the nitrile graft copolymer has a glass transition temperature of not higher than 0° C. and comprises 4 to 25% by weight, preferably 5 to 20% by weight, of the resin composition. When the quantity of the rubber trunk polymer is less than 5%, and especially less than 4%, by weight of the composition, it becomes difficult to absorb the low molecular weight substances. As a result, the effect on the improvement in transparency is decreased, and the molding fidelity becomes lower. When the quantity of the rubber trunk polymer is more than 20%, and especially more than 25%, by weight of the composition, the stiffness of the composition is excessively lowered, and the molding properties thereof are impaired.

The rubber trunk polymer, for example, consists of a polymer, especially a copolymer, of a monomer or monomer mixture composed principally of either one or both of conjugated diolefins and alkyl acrylates having 1 to 12 carbon atoms in the alkyl group. The monomer mixture for the copolymer can further contain one or more members selected from unsaturated nitriles, alkyl methacrylate, aromatic vinyls, and monofunctional or polyfunctional monomers which are copolymerizable with the conjugated dienes or alkyl acrylates. The glass transition temperature of the rubber trunk polymer should not be higher than 0° C. from the viewpoint of impact resistance. Among these copolymers, the copolymer composed principally of a conjugated diolefin is especially preferred in that it gives enhanced impact strength to the resulting resin composition, which is desirable when mold flashes are removed and the molded product is in use. By the term "composed *principally of*" or "comprise *principally*" appearing in the present specification is meant that the component in question comprises at least 50% by weight.

Both the branch polymer component of the nitrile graft copolymer and the nitrile random copolymer contain altogether, on a basis of the total amount of the branch polymer and the nitrile random copolymer in the resin composition, 25 to 90% by weight, preferably 40 to 80% by weight of polymerized units of an unsaturated nitrile, in addition thereto, 10 to 75% by weight of polymerized units of at least one monomer selected from alkyl acrylates, alkyl methacrylates, aromatic vinyls, acrylic acid, methacrylic acid, acryl amide, vinyl esters and alkyl vinyl ethers, and, if desired, not more than 10% by weight of polymerized units of another monomer copolymerizable with the unsaturated nitrile. The term "polymerized units" used herein means the state of the relevant monomer which has been polymerized and taken into the copolymer in the form of random or block polymers.

As the unsaturated nitrile, acrylonitrile and methacrylonitrile are especially preferred. The nitrile random copolymer or the branch polymer of the nitrile graft copolymer are formed by copolymerizing the mixed monomers which are substantially in the range of the above-mentioned ratio or graft-polymerizing the monomer mixture onto the above-mentioned rubber trunk polymer. Especially for this purpose, a monomer mixture comprising principally acrylonitrile and an acrylate or a monomer mixture comprising principally methacrylonitrile and a methacrylate or/and styrene is preferably employed.

When the above-mentioned unsaturated nitrile component in the matrix resin, that is, in the nitrile random copolymer and the branch polymer of the nitrile graft copolymer, is less than 40% by weight, and especially, less than 25% by weight, the anti-electrification of the resulting resin composition is not sufficient. When the unsaturated nitrile component therein is more than 80% by weight, and especially, more than 90% by weight, the melt viscosity becomes too high and, especially in the case of acrylonitrile, the molding operation becomes difficult because the thermal stability of the resin composition deteriorates. In this connection, the constitutions of the branch polymer and the nitrile random copolymer may, of course, be the same or different as long as they are in the above-mentioned ranges.

Since the transparency of the molded products of the resin composition is required, it is necessary that the refractive indexes of the rubber trunk polymer and the matrix resin be controlled to such a degree that the difference in refractive indexes in the wavelength of the laser rays used is not more than 0.008, and that a molded product 3 mm in thickness have a transmittance in diethyl phthalate of not lower than 95%, preferably not lower than 97%, most preferably not lower than 98% with respect to the laser rays used. In this case, the transmittance with respect to the laser rays used is measured by means of a double-beam type recording spectrophotometer. More specifically, $10 \times 10 \times 50$ mm quartz cells filled with diethyl phthalate are set respectively in a specimen-side light path and in a reference-side light path. A specimen plate 3 mm in thickness prepared from the resin composition to be measured is set in the specimen-side quartz cell in such a manner that the surface of the specimen plate is perpendicular to the laser beam. Thus, the transmitted quantity of the laser rays used is measured, and the transmittance of the rays is calculated from the ratio of this transmitted quantity of the laser rays to that when the specimen is not inserted.

The above described resin composition of the present invention for information discs has a small die swell ratio and good molding fidelity. Preferably, however, the composition of the resin composition is so selected that the die swell ratio will be not more than 1.60 and more preferably not more than 1.55 under the conditions of a shear rate of 140 sec$^{-1}$ and a resin temperature in the die of 160° C. when tested by means of a Kōka type flow tester with a non-tapered die having a 1 mm $\phi \times 10$ mm capillary.

The above mentioned nitrile copolymers can be prepared with a radical initiator and, if desired, a chain transfer agent in accordance with a conventional polymerization process such as emulsion polymerization or suspension polymerization process. It is desirable that the average particle size of the rubber trunk polymer constituting the nitrile graft copolymer be not more than $0.3\mu$ and preferably not more than $0.1\mu$ in the stage before the graft polymerization is carried out since an adverse effect on the transparency may arise when the particle size is larger than $0.1\mu$, especially when it is larger than $0.3\mu$. The average particle size of the rubber trunk polymer can be readily controlled to a specific particle size in accordance with a conventional polymerization process in which the quantities of emulsifiers and initiators are controlled, and a conventional seed polymerization process.

Furthermore, the graft polymerization process can be carried out in several stages. In each graft polymerization step, any monomer mixture can be used as long as its composition is within the above mentioned range. The resin composition of the present invention is of anti-electrification character even as it is, but if desired, an antistatic agent can be added thereto. Other additives such as pigments, releasing agents, lubricants, and processing aids can also be added to the composition.

The resin composition for information discs of the present invention can be molded into a disc-like shape according to the conventional methods such as hot pressing and injection molding. Under such molding conditions, low molecular-weight substances present in the resin can readily migrate into the dispersed rubber phase. If necessary, of course, the molding may be carried out after low molecular-weight substances have been extracted and removed from the resin composition.

The transparent resin composition for information discs of the present invention can be provided with a transmittance of not lower than 95% with respect to laser rays having the wavelengths generally in the range of 5000 to 20000 Å by exercising the above-mentioned controls among the respective components. A suitable laser ray is exemplified by He-Ne laser ray having a wavelength of 6328 Å.

The present invention will be further described by way of the following examples and comparison examples. The quantities expressed in parts and percentages in the examples are based on weight.

EXAMPLE 1

(Step A)

An aqueous dispersion comprising the following materials was adjusted to a pH of 7 with an aqueous solution of sodium hydroxide and then charged into a 10- liter stainless-steel autoclave equipped with agitation vanes.

|  | Parts |
| --- | --- |
| 1,3-butadiene | 35 |
| methyl acrylate | 15 |
| tert-dodecyl mercaptan | 0.25 |
| diisopropylbenzene hydroperoxide | 0.1 |
| formaldehyde sodium sulfoxylate | 0.05 |
| ferrous sulfate heptahydrate | 0.002 |
| disodium ethylenediamine tetraacetate | 0.003 |
| sodium pyrophosphate | 0.25 |
| sodium dodecylbenzene sulfonate | 0.25 |
| deionized water | 150 |

The air within the autoclave was thoroughly purged with nitrogen, and the charge was agitated for 20 hours at 40° C. A latex of rubber trunk polymer having an average particle size of $0.075\mu$ was obtained in a yield of 99%.

The following materials were added to the rubber latex, and the air within the autoclave was thoroughly purged with nitrogen and the resulting mixture was agitated for 20 hours at 40° C.

|  | Parts |
| --- | --- |
| acrylonitrile | 27.5 |
| methyl acrylate | 22.5 |
| n-dodecyl mercaptan | 1.2 |
| diisopropylbenzene hydroperoxide | 0.1 |
| formaldehyde sodium sulfoxylate | 0.05 |
| sodium dodecylbenzene sulfonate | 0.1 |
| deionized water | 150 |

To the resulting reaction system were then added the following materials which had been mixed with agitation in a homogenizer.

|  | Parts |
| --- | --- |
| 2,6-di-tert-butyl-4-methylphenol | 0.25 |
| dilaurylthiodipropionate | 0.15 |
| benzene | 0.25 |
| 1% aqueous solution of sodium dodecyl-benzene sulfonate | 4.35 |

(Step B)

Separately, an aqueous suspension comprising the following materials was adjusted to a pH of 5 with an aqueous solution of sulfuric acid, and then charged into a 10-liter stainless-steel autoclave with agitation vanes.

|  | Parts |
| --- | --- |
| acrylonitrile | 60 |
| methyl acrylate | 40 |
| n-dodecyl mercaptan | 1.5 |
| potassium persulfate | 0.04 |
| sodium hydrogen sulfite | 0.01 |
| deionized water | 300 |
| sodium dodecylbenzene sulfonate | 1.0 |

The air within the autoclave was thoroughly purged with nitrogen, and the charge was agitated for 20 hours at 50° C.

88 parts of the latex obtained in the step (B) was added to 12 parts of the latex obtained in the step (A). The mixture was mixed, as in the form of latex, by agitation, and subjected to precipitation by adding 12.5 parts of 4% aqueous solution of aluminium sulfate, followed by adjustment of the system to a pH of 7. The resulting precipitate was dehydrated, washed, and then dried for 24 hours at 50° C., to obtain a white powder in a yield of 97% throughout the above described steps.

The resulting powder was kneaded for 3 minutes with rolls having a surface temperature of 140° C. and then press-molded at 160° C. and 200 kg/cm² for 2 minutes into test pieces. The test pieces were stored for a week in an atmosphere of 20° C. and 50% RH (relative humidity). The properties of the test pieces were then measured in accordance with the test methods shown in Table 1 to obtain the results as shown in Table 2.

The powder prepared above was formed into pellets by extruding the powder at a resin temperature of 150° C. by means of an extruder. The resulting pellets were fabricated into information discs, in the process of which a long-term continuous molding was possible because of the excellent thermal stability of the pellets, and the molding operation was carried out very readily because of good mold-release property.

EXAMPLE 2

An aqueous solution comprising the following materials was adjusted to a pH of 7 with an aqueous solution of potassium hydroxide and then charged into a 10-liter stainless-steel autoclave with agitation vanes.

|  | Parts |
| --- | --- |
| 1,3-butadiene | 4.2 |
| methyl methacrylate | 1.8 |
| tert-dodecylmercaptan | 0.03 |
| diisopropylbenzene hydroperoxide | 0.012 |
| formaldehyde sodium sulfoxide | 0.003 |
| ferrous sulfate heptahydrate | 0.000192 |
| disodium ethylenediaminetetraacetate | 0.000288 |
| sodium pyrophosphate | 0.003 |
| sodium dodecylbenzene sulfonate | 0.03 |
| deionized water | 18 |

The air within the autoclave was thoroughly purged with nitrogen, and the charge was agitated for 20 hours at 40° C. to obtain a rubber latex having an average particle size of $0.075\mu$ in a yield of 99%.

To the latex obtained were added the following materials.

|  | Parts |
| --- | --- |
| acrylonitrile | 56.4 |
| methylacrylate | 37.8 |
| n-dodecyl mercaptan | 1.88 |
| potassium persulfate | 0.036 |
| sodium hydrogen sulfite | 0.009 |
| sodium dodecylbenzene sulfonate | 0.36 |
| deionized water | 282 |
| 0.1 N aqueous solution of acetic acid | 25 |
| 0.1 N aqueous solution of sodium acetate | 25 |

The mixture was adjusted to a pH of 5 with an aqueous solution of sulfuric acid, and the air within the autoclave was thoroughly purged with nitrogen. This was then followed by agitation for 20 hours at 50° C. The latex thus prepared was post-treated in the same way as in Example 1 to obtain a white powder in a yield of 95%. The white powder was molded in the same way as set forth in Example 1 into test pieces and information discs, the properties of which were measured, whereupon the results shown in Table 2 were obtained.

EXAMPLE 3

Test pieces and discs were molded as described in Example 1, except that the mixing ratio of the latex obtained in the step (A) to the latex obtained in the step (B) of Example 1 was 40 parts to 60 parts. The properties were measured in the same manner, whereupon the results shown in Table 2 were obtained.

EXAMPLE 4

Test pieces and discs were molded as described in Example 1, except that the quantities of 1,3-butadiene and methyl acrylate in the ingredients of the rubber trunk polymer as set forth in Example 1 (A) were changed to 30 parts and 20 parts, respectively, and the quantities of acrylonitrile and methyl acrylate in the ingredients of the branch polymer to 30 parts and 20 parts, respectively. The properties were measured in the same manner as in Example 1, whereupon the results shown in Table 2 were obtained.

EXAMPLE 5

Test pieces and discs were molded in the same manner as in Example 1 except that the ingredients were changed as follows.

The ingredients of the rubber trunk polymer as set forth in the step (A) of Example 1 were changed to

|  | Parts |
|---|---|
| n-butyl acrylate | 32.5 |
| styrene | 17.5 |
| ethyleneglycol dimethacrylate | 0.5; | the ingredients of the graft polymer were changed to

|  |  |
|---|---|
| methacrylonitrile | 25 |
| n-butyl methacrylate | 25 |
| n-dodecylmercaptan | 1.0; | and the ingredients of the nitrile random copolymer as set forth in the step (B) were changed to

|  |  |
|---|---|
| methacrylonitrile | 50 |
| n-butyl methacrylate | 50 |
| n-dodecylmercaptan | 1.0 |

The properties were measured as in Example 1, whereupon the results shown in Table 2 were obtained.

COMPARISON EXAMPLE 1

An aqueous solution comprising the following materials was adjusted to a pH of 5 and then charged into a 10-liter stainless-steel autoclave with agitation vanes.

|  | Parts |
|---|---|
| acrylonitrile | 60 |
| methyl acrylate | 40 |
| n-dodecylmercaptan | 3 |
| potassium persulfate | 0.04 |
| sodium hydrogen sulfite | 0.01 |
| sodium dodecylbenzene sulfonate | 1.0 |
| deionized water | 300 |

The air within the autoclave was thoroughly purged with nitrogen, and the charge was agitated for 15 hours at 50° C.

The latex thus formed was taken out of the autoclave, subjected to precipitation with an aqueous solution of aluminium sulfate, and then adjusted to a ph of 7 with an aqueous solution of sodium pyrophosphate. The resulting precipitate was subjected to dehydration, washing, and then to drying at 60° C. for 24 hours, to obtain a white powder in a yield of 97%. The resulting powder was tested as in Example 1. The results are shown in Table 2.

COMPARISON EXAMPLE 2

Test pieces were prepared as in Example 1 except that the 35 parts of 1,3-butadiene and 15 parts of methyl acrylate were replaced with 10 parts of methyl methacrylate. The test results are shown in Table 2.

Table 1

Physical Properties and Measurement Thereof

Transmittance of laser rays

As described hereinbefore.

The laser ray used was a He-Ne laser ray of 1 mW output (wavelength of 6328 Å). Dimension of specimen: $10 \times 45 \times 3$ mm.

Strength of reflected laser rays (V)

A smooth-surface sheet was prepared by a press molding method. Aluminium was vapor-deposited on one surface of the sheet to make a reflective surface. A laser ray of a wavelength of 6328 Å generated from a He-Ne laser generator of 1 mW output was projected from the other side surface of the sheet. The laser ray was condensed by a condenser lens placed just before the test sheet. The condenser lens was focused to project a laser beam of 0.8-micron diameter on the vapor-deposited aluminium surface. The reflected beam is again passed through the condenser lens and then separated with a half-mirror. The strength of the reflected beam was detected by a phototube and used for comparison. The measured data represent the values read on a recording meter by voltage and show the relative strength of the reflected beam. Dimension of each specimen: $50 \times 50 \times 1.1$ mm.

Die swell ratio

As described hereinbefore.

Frictional electrification

Measured by means of a Kyoto University Chem. Res. Inst.-type rotary static tester at 430 rpm. Indication as electrification charge potential (V) after frictional rubbing for 1 minute. Dimension of each specimen: $30 \times 50 \times 0.5$ mm.

Impact resistance

Measured by means of a Dynstat impact testing machine with a small-type weight in accordance with BS1330-1946. The angle of the pendulum was set at 90°. Dimension of each specimen: 2 (thickness) $\times$ 10 (width) $\times$ 15 (length) mm.

Refractive index

Measured by means of an Abbé refractometer in accordance with ASTM D542-50. As the specimens, the rubber trunk polymers, branch polymers and random copolymers were produced separately by polymerization. The refractive indexes of these polymers were measured separately, and the differences in refractive indexes were calculated therefrom. The measurements were carried out at 20° C. with white light as a light source. Methylene iodide was used as a contacting liquid.

(note): In the measurement of all the physical properties as described above, the specimens were pretreated by storing them for 3 days under the conditions of a temperature of 23° C. and a relative humidity of 50%.

TABLE 2

| | Transmittance of rays (%) | Strength of reflected laser beam (V) | Die swell ratio | Frictional electrification voltage (V) | Impact resistance (Kg . cm) | Thermal stability | Mold release property | Difference in refractive indexes between rubber trunk polymers & matrix resins |
|---|---|---|---|---|---|---|---|---|
| Example 1 | 99.2 | 0.69 | 1.42 | 500 | 2.1 | Good | Good | 0.0067 |
| Example 2 | 98.5 | 0.69 | 1.42 | 250 | 2.0 | " | " | 0.0055 |
| Example 3 | 98.6 | 0.69 | 1.37 | 420 | 20.0 | " | " | 0.0075 |
| Example 4 | 99.0 | 0.72 | 1.50 | 530 | 1.5 | " | " | 0.0033 |
| Example 5 | 98.4 | 0.70 | 1.44 | 450 | 1.8 | " | " | 0.0002 |
| Comparison Example 1 | 94.0 | 0.66 | 1.64 | 630 | 1.0 | " | " | — |
| Example 2 | 86.4 | 0.60 | 1.42 | 480 | 1.8 | " | " | 0.0119 |

From the Table 2, it is observed that the resin compositions illustrated in the Examples of the present invention have higher transparency and smaller die swell ratios, which are the measures of good molding fidelity. It should be especially noted that the resin composition of the present invention comprising a two-phase system of the rubber trunk polymer and matrix resin phase has a transparency superior to that of the specimen of a one-phase system obtained in Comparison Example 1.

All of the resin compositions shown in the above described Examples exhibit transmittances of at least 95% with respect to the laser rays of wavelengths in the range of 5,000 to 20,000 Å (not restricted to the wavelength of 6328 Å). As described in detail above, the resin composition of the present invention, because of the presence of the rubber trunk polymer therein, is improved in transparency and molding fidelity and is excellent as a resin composition for information discs.

What is claimed is:

1. In a transparent resin composition for information signal recording discs each having information pits engraved on one side thereof and a metal coating deposited thereon, information signals recorded on the information pits being reproducible by irradiation with laser rays from the opposite side of said disc, the improvement wherein the resin composition comprises (1) 6 to 100% by weight of a nitrile graft copolymer having a rubber trunk polymer and a branch polymer grafted thereon, which has been obtained by graft-polymerizing onto the rubber trunk polymer a monomer mixture consisting of an unsaturated nitrile and at least one monomer copolymerizable therewith selected from the group consisting of alkyl acrylates, alkyl methacrylates, acrylic acid, methacrylic acid, acryl amides, and alkyl vinyl ethers, and (2) 0 to 94% by weight of a nitrile randon compolymer of an unsaturated nitrile and at least one monomer copolymerizable therewith selected from the group consisting of alkyl acrylates, alkyl methacrylates, acrylic acid, methacrylic acid, acryl amides, vinyl esters and alkyl, the components of the resin composition other than the rubber trunk polymer constituting a matrix resin, wherein:

(a) said rubber trunk polymer has a glass transition temperature of not higher than 0° C. and constitutes 4 to 25% by weight of the resin composition;
   (b) the unsaturated nitrile constitutes 25 to 90% by weight of the matrix resin in the resin composition;
   (c) the difference in the refractive indexes between the rubber trunk polymer and the matrix resin is not more than 0.008; and
   (d) the resin composition, when molded into a 3 mm-thick plate, has a transmittance in diethyl phthalate of not lower than 95% with respect to the laser rays used.

2. The composition as set forth in claim 1, in which the rubber trunk polymer constituting the nitrile graft copolymer has an average particle size of not more than $0.3\mu$.

3. The composition as set forth in claim 1, in which the unsaturated nitrile is acrylonitrile or methacrylonitrile.

4. The composition as set forth in claim 1, in which the nitrile random copolymer and branch polymer are composed principally of polymerized units of acrylonitrile and an alkyl acrylate.

5. The composition as set forth in claim 1, in which the nitrile random copolymer and branch polymer are composed principally of polymerized units of methacrylonitrile and at least one from alkyl methacrylate.

6. The composition as set forth in claim 1, in which the die swell ratio of the composition is not more than 1.60.

7. The composition as set forth in claim 1, in which the laser rays to be used have a wavelength in the range of 5,000 to 20,000 A.

8. The composition as set forth in claim 7, in which the laser rays to be used are laser rays which are generated from a helium-neon laser generator.

* * * * *